US008259719B2

(12) United States Patent
Sharma et al.

(10) Patent No.: US 8,259,719 B2
(45) Date of Patent: Sep. 4, 2012

(54) METHOD AND APPARATUS FOR IMPOSING PREFERENCES ON BROADCAST/MULTICAST SERVICE

(75) Inventors: Ranjan Sharma, New Albany, OH (US); Ramesh Pattabhiraman, New Albany, OH (US)

(73) Assignee: Alcatel Lucent, Paris (FR)

( * ) Notice: Subject to any disclaimer, the term of this patent is extended or adjusted under 35 U.S.C. 154(b) by 427 days.

(21) Appl. No.: 12/642,099

(22) Filed: Dec. 18, 2009

(65) Prior Publication Data

US 2011/0149992 A1 Jun. 23, 2011

(51) Int. Cl.
*H04L 12/28* (2006.01)
*H04J 3/26* (2006.01)

(52) U.S. Cl. ........................................ 370/390; 370/432

(58) Field of Classification Search .................. 370/390, 370/434
See application file for complete search history.

(56) References Cited

U.S. PATENT DOCUMENTS 7,720,432 B1 5/2010 Colby et al.
2002/0007374 A1* 1/2002 Marks et al. .................. 707/513
2002/0167947 A1* 11/2002 Hallford et al. ............... 370/390
2005/0135366 A1* 6/2005 Trappeniers et al. ......... 370/390
2005/0220103 A1* 10/2005 Wild et al. .................... 370/390
2006/0092938 A1* 5/2006 Gentrix ......................... 370/390
2007/0220342 A1* 9/2007 Vieira et al. .................... 714/33
2009/0037958 A1* 2/2009 Traw et al. ...................... 725/46
2009/0158328 A1 6/2009 Huysegems et al.

* cited by examiner

*Primary Examiner* — Andrew Lee
(74) *Attorney, Agent, or Firm* — Fay Sharpe LLP

(57) ABSTRACT

An apparatus for imposing preferences on broadcast/multicast service for an end-user is described herein. The apparatus includes a first tuner that receives a first set of data transmitted from a currently selected broadcast/multicast station, wherein the first set of data includes time, station identification, and program information; a second tuner that receives a second set of data from a plurality of broadcast/multicast stations, wherein the second set of data includes individually, for each broadcast/multicast station that is available, time, station identification, and program information; a decoder that decodes the first and second sets of data received by the first and second tuners and sends this decoded data to a decision engine for further processing; and a persona database that stores a plurality of user preference profiles. Further, the decision engine is periodically operative to evaluate the currently selected station, and choose a different station if applicable, based on a preference profile selected by the end-user.

22 Claims, 2 Drawing Sheets

METHOD AND APPARATUS FOR IMPOSING PREFERENCES ON BROADCAST/MULTICAST SERVICE

BACKGROUND OF THE INVENTION

This invention relates to a method and apparatus for imposing preferences on broadcast/multicast service. While the exemplary embodiment of the invention is particularly directed to the art of audio communications, and will be thus described with specific reference thereto, it will be appreciated that the invention is equally applicable to other public broadcast/multicast media and has usefulness in other fields and applications. For example, the invention can be used with video and multimedia communications.

By way of background, it is a frequent occurrence for an end-user to tune into a broadcast/multicast station and find little of interest. At other times, it is common for an end-user to find an initial segment of a program to be of interest, but the latter part is no longer of interest to the audience. This gives rise to the so called "channel surfing" phenomenon. However, even with channel surfing, there is a large likelihood of missing out on a more interesting program, while having selected another program.

This poses a dilemma—should the audience poll all available channels sequentially before selecting a channel that is of interest, and, having selected such a channel, how would the audience know that another more interesting program would begin in a moment?

The broadcast/multicast media offered is for general consumption by the masses, and this plethora of choices puts the audience in the above quandary. Therefore, a need exists to let the audience make an intelligent choice between available media channels so as to closely match their interests and preferences.

Broadcasting/multicasting stations typically publish a schedule of their programming in one or more of the following ways, among others:

- TV and Radio Station Guides published on paper
- EPG (Electronic Programming Guide) sent via the broadcast/multicast media itself
- Ticker lines at the bottom of the visual display providing information about the next program on this channel
- Announcements of "coming attractions" on an audio channel The solutions are all disparate and each one comes with its shortcomings. The multitude of the available channels makes it next to impossible to get a sense from hundreds of entries at any given time in the paper guide to choose the right channel. EPG has the issue that if the channels are not juxtaposed, it requires several clicks on the remote to locate them and compare the contents. Ticker lines provide information on what is next on the tuned-to channel, not on another one, and the audio announcements suffer from the same problem.

Secondly, a large selection of personal portable entertainment devices provide for personalization, whereby a person can choose specific audio songs, or video programming to be rendered from these devices. While this is one way of personalization, it is to be noted that the preference imposition is not being made on a channel and these are unicast (or shared between a couple of friends at most) channels. An associated shortcoming with this approach is that the audience may be subjected to a repeat of select choices only, since it is not conceivable that such portable devices can hold a library of all possible media elements of interest to a person. Such a library would be physically difficult to create and maintain as well as being economically unviable.

The present invention contemplates a new and improved method and apparatus that resolve the above-referenced difficulties and others.

SUMMARY OF THE INVENTION

In one aspect of the invention, a method of imposing preferences on broadcast/multicast service for an end-user using an electronic device is provided. The method comprises the steps of: (a) retrieving a first set of meta-data from a first broadcast/multicast station that the electronic device is currently tuned to via a first tuner in the electronic device; (b) retrieving a second set of meta-data from a plurality of other available broadcast/multicast stations via a second tuner in the electronic device; (c) evaluating the first and second sets of meta-data retrieved by the first and second tuners to identify at least one of the broadcast/multicast stations for an end-user using a decision engine in the electronic device, wherein the evaluation of the meta-data is performed against a preference profile of the end-user, who has previously selected a persona that provides the preference profile; (d) tuning to one of the available broadcast/multicast stations based on the evaluation via the first tuner; and (e) periodically repeating steps (a) through (d), preferably at a frequency determined by a value set in the preference profile.

In another aspect of the invention, a method of imposing preferences on broadcast/multicast service for an end-user using an electronic device is provided. The method includes loading a preference profile selected by the end-user and a list of rules and constraints applicable to the preference profile into a decision engine of the electronic device, wherein the preference profile includes at least a prioritized execution list for choosing a broadcast/multicast station; tuning to a first broadcast/multicast station with a primary tuner of the electronic device and receiving a first set of data transmitted from the first broadcast/multicast station, wherein the first set of data includes time, station identification, and program information, which may include genre, artist and title; and activating a second tuner of the electronic device to retrieve a second set of data transmitted from a plurality of broadcast/multicast stations, wherein the second set of data includes time, station identification and program information, which may include genre, artist and title. The first and second sets of data are then loaded into the decision engine, which uses the prioritized execution list of the preference profile, the list of rules and constraints, and the first and second sets of data to select a broadcast/multicast station for the end-user. Optionally, the selection of the broadcast/multicast station is automatic, and the selection is periodically evaluated against the available sets of data to effect a switch-over.

In yet another aspect of the invention, an apparatus for imposing preferences on broadcast/multicast service for an end-user is provided. The apparatus includes a first tuner that receives a first set of data transmitted from a currently selected broadcast/multicast station, wherein the first set of data includes time, station identification, and program information, which may include genre, artist and title; a second tuner that receives a second set of data from a plurality of broadcast/multicast stations, wherein the second set of data includes individually, for each broadcast/multicast station that is available, time, station identification, and program information, which may include genre, artist and title; a decoder that decodes the first and second sets of data received by the first and second tuners and sends this decoded data to a decision engine for further processing; and a persona database that stores a plurality of user preference profiles. Further, the decision engine is periodically operative to evaluate the currently selected station based on a preference profile selected by the end-user. Preferably, the decision engine evaluates whether the currently selected station is the best choice for the end-user based on the preference profile selected by the end-user and if not, then the currently selected station is de-tuned and the device tunes into the best choice for the end-user.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
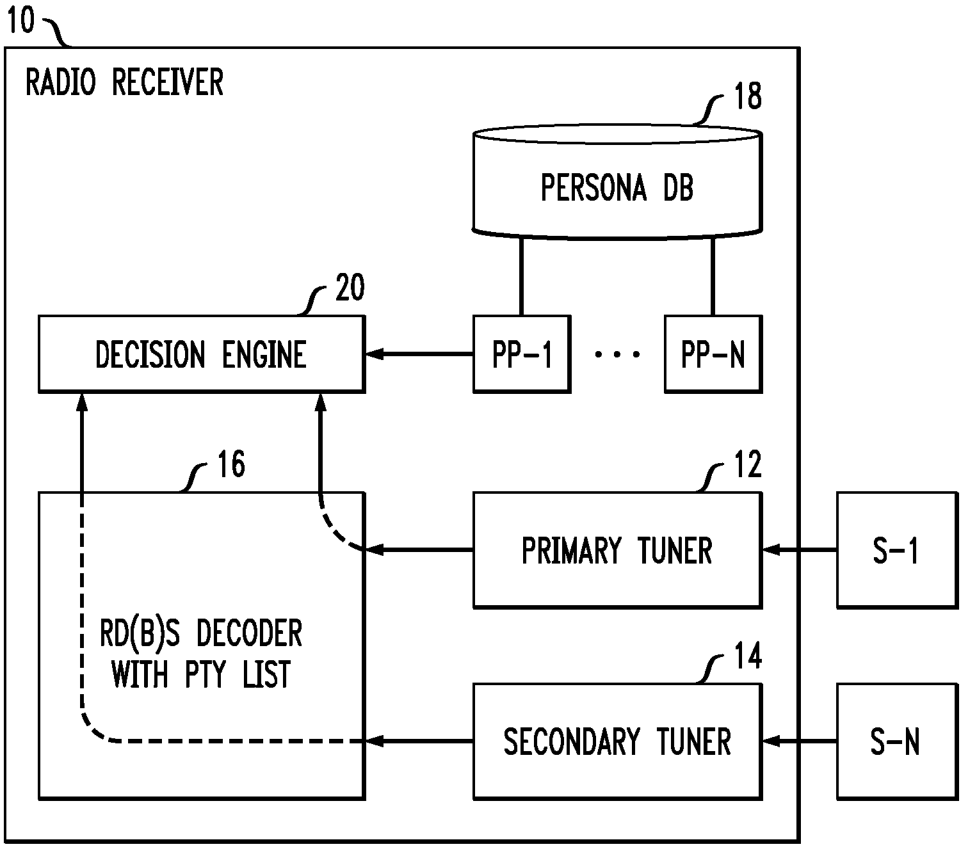
FIG. 1 is a block diagram of a system that incorporates aspects of the exemplary embodiments of the present invention.

Referring now to the drawings wherein the showings are for purposes of illustrating the exemplary embodiments only and not for purposes of limiting the claimed subject matter, FIG. 1 provides a view of a system that incorporates aspects of the present invention. As shown generally, the system of FIG. 1 includes a first broadcast/multicast station S-1, a plurality of additional broadcast/multicast stations S-N, and an electronic device 10. The electronic device 10 typically includes components such as a primary tuner (or scanner) 12, a secondary tuner (or scanner) 14, an RDS/RDBS decoder 16, a persona database 18, and a decision engine 20.

The electronic device 10 is generally capable of tuning into broadcast/multicast channels, such as a radio receiver, a TV tuner (or a set-top box tuner), a Web-based page that accepts RSS feeds, etc. It is noted that the electronic device 10 may comprise a satellite radio receiver as well.

The persona database 18 allows for the creation and maintenance of multiple "personas," including a default "null" persona, for end-users of the electronic device 10. At least two ways of persona creation are contemplated, that is, (a) based on mood and/or (b) based on a name. For option (a) above, some examples include upbeat, downbeat, sad, happy level moods. For option (b) above, this can be a personalization based on the device owner and, in the event this is a shared device where different people share the device at different times, a current user may choose a persona that reflects the taste of the user. So, for example, when Dad is using the device, the chosen persona is "Dad." Of course, each single end-user may have multiple personas. To simplify the following description, there will be no further distinction between options (a) and (b) above.

Each persona is associated with a preference profile (i.e., PP-1 to PP-N) and a mode of selection of persona, with a default of 'Null' persona selection while using the electronic device 10. Each persona type is thus associated with a preference profile (PP-1 to PP-N) of likes, dislikes and associated constraints and rules. This feature will be described in further detail below. At the time of operating the electronic device 10, the user exercises a selection capability on the electronic device via a user interface (not shown) or other means (e.g., remotely) to choose a persona, or go with the default (null) persona. By default, upon choosing no persona, no preferences are imposed and the channel acts just like today. It is to be understood that the provisioning of the persona(s) and associated preference profile(s) may be accomplished locally through a user interface on the electronic device 10 or remotely through a suitable mechanism.

Optionally, the persona database and the associated preference profiles may be stored external to the electronic device 10 and in a central location. In that case, electronic devices would have connectivity to the central repository, whereby each of the electronic devices can refer to the same central copy instead of the end-user being required to provision the preference profiles in several devices separately.

Radio broadcasting is an audio (sound) broadcasting service, broadcast through the air as radio waves (a form of electromagnetic radiation) from a transmitter to a receiving antenna. Radio stations can be linked in radio networks to broadcast common programming, either in syndication or simulcast or both. Audio broadcasting also can be done via cable FM, local wire networks, satellite and the Internet. The broadcast/multicast stations S-1 to S-N shown in FIG. 1 are all capable of sending meta-data for the program broadcasts/multicasts.

A dual-scanning capability is inherent in the electronic device 10. A dual-scanning capability may be implemented through the first and second tuners/receivers 12, 14. This is common in some devices, but not all devices necessarily have this capability. In essence, this requires a capability at the electronic device 10 to stay tuned to one transmitting station and, in parallel, be able to scan the given frequency spectrum. For instance, a radio tuner may scan the FM band between 88-107 MHz, a TV tuner may scan UHF and VHF frequency bands, a set-top box on a TV may scan the available channels, a computer application may scan a set of known Internet TV stations etc.

A set of rules and constraints is included. This feature requires a set of rules that take into account the preference profiles PP-1 to PP-N.

A set of associated enhancements can be applied in conjunction with the features described above. This refers to the decision engine execution for imposing the preferences on broadcast/multicast media channels.

With the features above, a broadcast/multicast source of media may be subject to the following choices and others:

- Forced de-tune and rules-based selection of another channel
- Selective muting/unmuting/other volume manipulation
- Selective display/non-display
- Rule-based selective channel skipping
- Fallback to locally stored media
- Powered off While other personalization examples are possible, the most common electronic device—a radio receiver—is chosen here for an exemplary embodiment of this invention.

Now, let us assume, for example, that a first end-user U1 listens to the electronic device 10 (in this case, a radio receiver) on a particular FM band (e.g., S-1). Assume also that the radio 10 is a shared device between the first end-user (U1) and a second end-user (U2).

Let us also assume, for example, that U1 has selected a persona with a preference profile (e.g., PP-1) that includes the following preferences:

Preference Profile (PP-1)

Likes:

L1. Rock band 1

L2. Rock band 2

L3. Rock band 3

L4. Rock band 4

L5. Rock band 5, except "Horrendous song"

L6. Station "WNCI"

L7. Genre—Rock Music

Dislikes:

D1. Talk shows

D2. Pop genre

D3. Jazz genre, except Jazz band 1

D4. Country music

In contrast, U2 may have a different PP (e.g., PP-2), or a default or "null" PP (no preferences indicated). It is to be noted that this concept may be further refined for a visual media, whereby a parent can create the initial preference data for the children to include their ages, so as to restrict the choice of program views to age-appropriate contents. In that case, the parent has the authority over part of the children's PP and the parent exercises the role of the PP administrator for setting initial parameters.

In this embodiment, the radio receiver 10 is a household radio, as opposed to a mobile radio integrated into a vehicle, which typically provides additional refinements via using meta-data (like AF, alternate frequencies, in case of a favored radio station going out of range or fading when a vehicle is moving away from the station).

A set of constraints may be associated with the preference profile PP-1, including, but not limited to, the following constraints:

C1. "Likes" list is in prioritized sequence.

C2. When first choosing a station, select the station that has a song playing from the highest priority.

C3. Do not switch stations in the middle of a playing song.

C4. When the currently playing song is not in the "likes" list, switch stations as soon as possible, allowing the receiver to switch in the middle of the song.

C5. If none of the available stations is playing a song from the "likes" list, fall back to locally available music library, if one is available.

C6. Where a fall-back local music library is not available, and in the absence of any broadcast/multicast that matches the "Likes" preferences, lower the volume of the electronic device.

Additional enhancements allow for time-based rules and content-based rules to be applied. Such rules associated with the preference profile PP-1 may include, but are not limited to, the following:

E1. Do not increase the volume if the current time is after 10:00 P.M.

E2. Increase the volume by a percentage value when the content belongs to the top 3 of "likes."

E3. Mute the volume if the content is not in "likes" (e.g., an advertisement).

The selection of a persona and its associated preference profile provides the basis for the decision engine 20 noted above.

Figure 2:
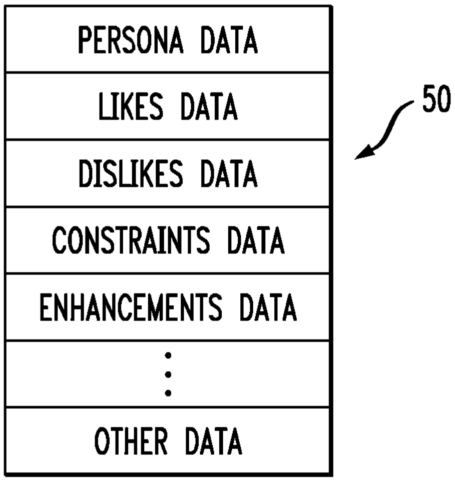
FIG. 2 is a memory layout of data stored in the persona database for end-users in accordance with aspects of the present invention.

The persona database 12 generally includes any number of data sub-blocks for each preference profile (PP-N), as shown in FIG. 2. They are shown as a super block 50, not all of whose fields are filled for a particular subscriber. The super block 50, as known in the art, can be accessed from the identity of any one of several fields within it. The super block 50 may include any number of data sub-blocks, such as a first sub-block 52 that contains persona data, a second sub-block 54 that contains "likes" data, a third sub-block 56 that contains "dislikes" data, a fourth sub-block 58 that contains "constraints" data, and/or a fifth sub-block 60 that contains "enhancements" data. Of course, any number of additional sub-blocks 62 may be provided in the super block 50 for storing other pertinent preference profile data. In general, each user of the device 10 would create a persona that reflects the user interest and preferences. In addition, there can be a few generic profile entries that are available for any or all users. These entries reflect mood-based setting preferences, or even occasion-appropriate preferences. A user can freely select from a Null persona, or any of the other available personas associated with the device. In one embodiment, a user can be constrained to use only the preference profile created and owned by the user. In another embodiment, a user can additionally select any of the generic preferences. In yet another embodiment, a user can freely choose from all available personas.

For this embodiment, it is assumed that the broadcast/multicast stations S-1 to S-N embed meta-data (or meta-information) in conventional FM broadcasts/multicasts. Radio Data System, or RDS, is a communications protocol standard for embedding small amounts of digital information in conventional FM radio broadcasts. The RDS system standardizes several types of information transmitted, including time, station identification and program information. Radio Broadcast Data System (RBDS) is the official name used for the U.S. version of RDS. The two standards are nearly identical, with only slight differences. The standard began as a project of the European Broadcasting Union (EBU), but has since become an international standard of the International Electrotechnical Commission (IEC).

Both systems use a 57 kHz subcarrier to carry data at 1,187.5 bits per second with provisions for error correction. The 57 kHz frequency was chosen for being the third harmonic of the pilot tone for FM stereo, so it would not cause interference or intermodulation with it, or with the stereo difference signal at 38 kHz (the second harmonic). The data format utilizes error correction. RDS defines many features including how private (in-house) or other undefined features can be "packaged" in unused program groups.

Various information fields are normally contained in the RDS/RBDS data. The following information fields may be used in the exemplary embodiments in the manner stated below:

CT—Clock Time—This is used to synchronize the receiver clock for time-based rules/constraints.

EON—Enhanced Other Networks—This monitors other networks or stations. Typically this is used for monitoring traffic information in a moving vehicle, and it allows a temporary tuning into a station that is broadcasting traffic information. In the present invention, this logic is enhanced to go beyond just traffic information.

PI—Program Identification—This is the unique code that identifies the station.

PS—Program Service—This is an eight-character static display that represents the call letters or station identity name ("WNCI", "Sunny 95", etc.).

PTY—Program Type—This coding of pre-defined program types allows users to find similar programming by genre, as described more fully below.

RT—Radio Text—This function is useful for getting station information and program information (including titles and artist of the currently playing song) in a 64-character text string.

In addition, the RDS/RDBS defines a "Traffic Announcement mode, which is indicated by a "TA" flag. When this flag is set, the volume of a traffic bulletin (indicated by "TP", or Traffic Program) is increased. A similar functionality would be used in the exemplary embodiments.

Table 1, shown below, lists the RDS and RBDS Program Type codes and their meanings:

TABLE 1

PROGRAM TYPE (PTY) CODES

| PTY code | RDS Program type (EU) | RBDS Program type (North America) |
|---|---|---|
| 0 | No program type or undefined | No program type or undefined |
| 1 | News | News |
| 2 | Current affairs | Information |
| 3 | Information | Sports |
| 4 | Sport | Talk |
| 5 | Education | Rock |
| 6 | Drama | Classic Rock |
| 7 | Culture | Adult Hits |
| 8 | Science | Soft Rock |
| 9 | Varied | Top 40 |
| 10 | Pop Music | Country |
| 11 | Rock Music | Oldies |
| 12 | Easy Listening | Soft |
| 13 | Light classical | Nostalgia |
| 14 | Serious classical | Jazz |
| 15 | Other Music | Classical |
| 16 | Weather | Rhythm and Blues |
| 17 | Finance | Soft Rhythm and Blues |
| 18 | Children's programs | Language |
| 19 | Social Affairs | Religious Music |
| 20 | Religion | Religious Talk |
| 21 | Phone In | Personality |
| 22 | Travel | Public |
| 23 | Leisure | College |
| 24 | Jazz Music | Unassigned |
| 25 | Country Music | Unassigned |
| 26 | National Music | Unassigned |
| 27 | Oldies Music | Unassigned |
| 28 | Folk Music | Unassigned |
| 29 | Documentary | Weather |
| 30 | Alarm Test | Emergency Test |
| 31 | Alarm | Emergency |

Most home radio receivers generally support PS, RT and PTY. The addition of PI data provides additional selection criteria by being able to choose a station or a set of stations in the preference profile. In this regard, the RDBS/RDS decoder 16 decodes the data retrieved by the first and second tuners 12, 14 for further processing by the decision engine 20. The decoder 16 receives the data, parses it and displays it on an available attached display. In particular, the decision engine 20 is operative to evaluate whether the currently chosen station is the best choice for an end-user based on the preference profile selected by the end-user. Based on the meta-data of the station on the first tuner 12, the available information stored in temporary memory/scratch-pad and the set of rules and constraints for the preference profile of the end-user, the decision engine 20 is operative to determine whether the tuned station remains unchanged, or if the primary tuner 12 should switch over to a different station.

It is further noted that the decision logic is operative throughout the time for which the electronic device 10 is turned on. Thus, there is generally continuous meta-data collection from all available broadcasting/multicasting stations, even while receiving transmission and rendering it on the device 10, while periodically evaluating the current broadcast/multicast against a set of preferences at a frequency stated in the applicable preference profile. Note the use of the term "available" here—i.e., U1 may have a subscription to a station (e.g., S-1) and U2 may not have a subscription to the same station, while both use the same device. For example, Dad can watch HBO, while the kids cannot, by imposing parental control. Another example, the first tuner 12 can latch onto HBO that shows the current movie to be the top-most choice for U1, but U1 does not subscribe to HBO at all, and hence this choice must be rejected. Thus, another set of rules may apply on top of constraints specified in the applicable preference profile.

Figure 3:
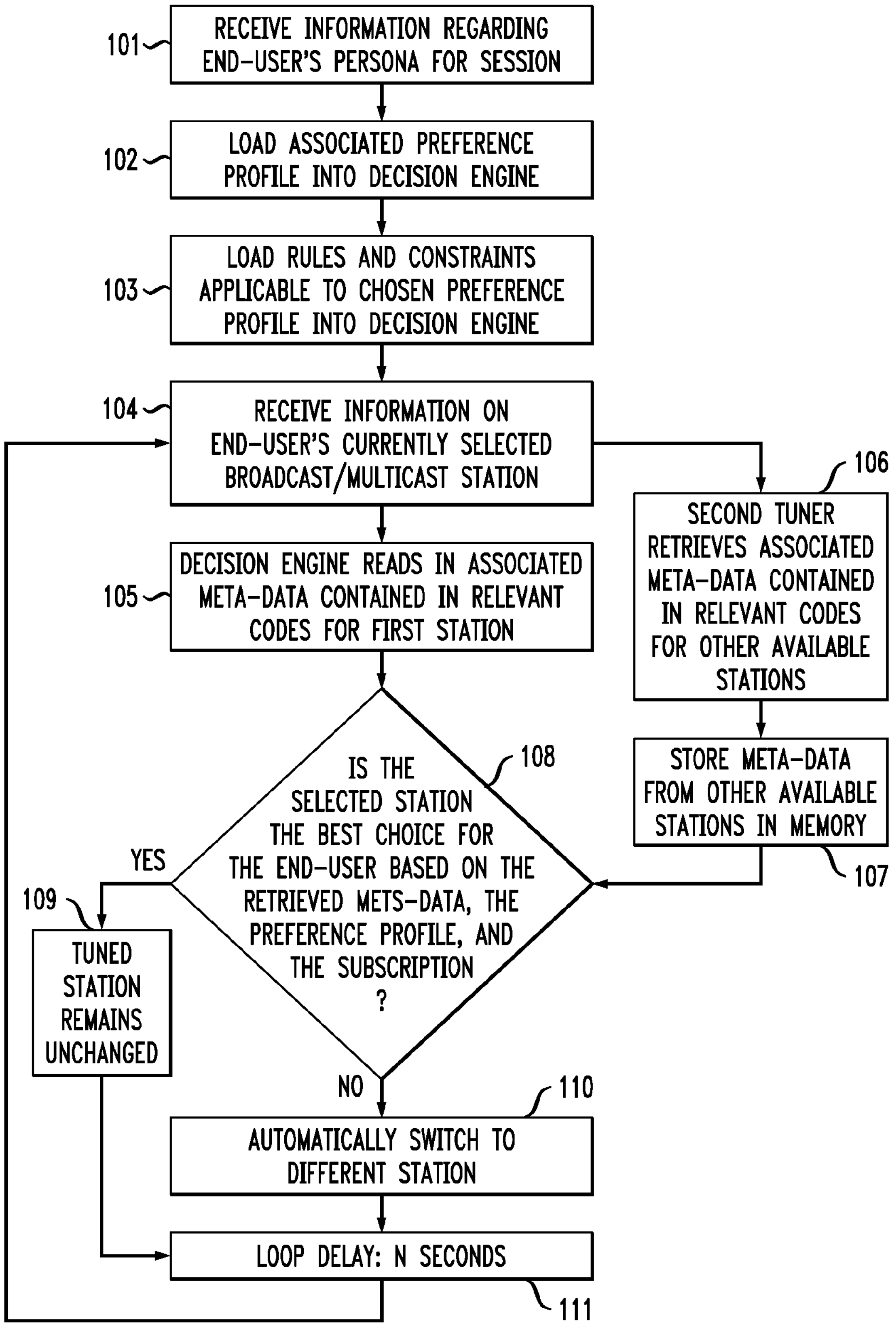
FIG. 3 is a flow chart illustrating an exemplary method of imposing preferences on broadcast/multicast service in accordance with aspects of the present invention.

FIG. 3 illustrates an exemplary method of imposing preferences on broadcast/multicast service. Once the first user U1 turns on the electronic device 10, the following steps occur:

Step 101: Via a user interface on the electronic device 10, U1 selects a persona for the session. Note that not choosing a persona is akin to the prior art, which is, U1 is subjected to experience whatever is being broadcast.

Step 102: The associated preference profile PP-1 (containing the Likes and Dislikes list for U1) for the persona is loaded into the decision engine 20.

Step 103: The rules and constraints applicable to the persona are loaded into the decision engine 20.

Step 104: U1 tunes into an initial broadcast/multicast station S-1 with the primary tuner 12. In this regard, the electronic device 10 receives information on U1's currently selected broadcast/multicast station.

Step 105: The decision engine 20 reads in the associated meta-data contained in CT, PI, PS, PTY and RT codes as received by the first tuner 12 from the initial station S-1.

Step 106: In parallel, the secondary tuner 14 is activated to retrieve the meta-data from the other broadcast/multicast stations S-2 to S-N transmitting in the spectrum that can be received by the electronic device 10. Additional constraints may apply here, based on the end-user's subscription. For instance, if a specific channel requires a paid subscription, it may not be available to all end-users and information from such channels may or may not be available to the tuner or scanner.

Step 107: The meta-data from other broadcast/multicast stations S-2 to S-N is stored in temporary memory/scratch-pad associated with the decision engine 20.

Step 108: In the prioritized execution list of PP-1, the decision engine 20 evaluates whether the currently chosen station is an optimal choice for U1. Based on the retrieved meta-data of the broadcast/multicast station on the first tuner 12, the available information stored in temporary memory/scratch-pad and the set of rules and constraints for the preference profile of the persona selected by U1, and the subscription, the decision engine 20 determines whether the tuned station remains unchanged, or if the primary tuner 12 should switch over to a different station.

Step 109: If the answer to the determination in step 108 is "yes," then the tuned station remains unchanged.

Step 110: If the answer to the determination in step 108 is "no," then the decision engine 20 automatically switches the first tuner 12 to another station.

Step 111: Optionally, there is a loop delay of N seconds. The tuners/scanners 12, 14 generally work continuously. However, after making a decision, it is allowed for the decision engine 20 to pause for a while. The value chosen for N determines the amount of non-favored broadcast/multicast an end-user may be subjected to. Keeping a low value of N, such as 10-15 seconds, may be tolerable in some cases. However, this is a user-selectable option, and it is captured in the preference profile of each user, with a default value of, say, 10 seconds. Setting a value of 0 seconds is possible, in which case, the execution loop becomes continuous without any pause.

In essence, the above-described method describes an evaluation loop that runs as follows:

(a) read the current broadcast/multicast station's meta-data with the first tuner 12;

(b) read or refresh all other available broadcast/multicast stations' meta-data with the second tuner 14;

(c) evaluate the meta-data retrieved by the tuners in view of the operative preference profile selected by the end-user to identify at least one of the broadcast/multicast stations for the end-user;

(d) pause the decision loop for N seconds, as specified in the preference profile chosen; and (e) repeat steps (a) through (d) at a frequency determined by a value set in the operative preference profile.

In the case of a selected broadcast/multicast station, additional enhancements (e.g., increasing/decreasing the volume) may be provided based on factors such as:

(a) Station rank in the "Likes" list (b) Station listed in the "Dislike" list (c) Time of day (d) Type of program In the case of visual media, any change in display can be an enhancement. In this way, children may be precluded from being subjected to age-inappropriate contents. Additionally, the age recorded in the preference profiles of children can be a gating factor for excluding certain channels altogether.

Optionally, if none of the broadcast/multicast stations S-1 to S-N meet the rules and constraints based on the personal profile PP-1 of U1, the decision engine 20 may choose to (a) play locally stored media, if available, and/or (b) lower the volume of the electronic device 10.

There may be a scenario in which the audience is watching a TV show (or listening to a radio program) consisting of multiple segments/various artists. This could be an award ceremony, or a music show for a specific genre or a sequence of top hits from the Billboard charts. When the show being watched is subjected to the method described herein, the effect would be to impose the operative preference profile on the program segment. In this case, the audience may experience automatic channel switching, the volume manipulated, etc., as defined in the constraints and rules of the preference profile. The granularity of resolution in case of TV (or radio) shows does not need to be the entire slot (e.g., 7 p.m.-8 p.m.) of the program segment, in fact, the chosen value of "N" defines the granularity that controls the duration for which an audience may be subjected to experience a broadcast/multicast.

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to devices for performing the operations herein. These devices may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. In addition, the present invention is not described with reference to any particular programming language. It will be appreciated that a variety of programming languages may be used to implement the teachings of the invention as described herein.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. In an electronic device that receives broadcast/multicast service, a method of imposing preferences on the broadcast/multicast service for an end-user, the method comprising:

(a) retrieving a first set of meta-data from a first broadcast/multicast station that the electronic device is currently tuned to via a first tuner in the electronic device;

(b) retrieving a second set of meta-data from a plurality of other available broadcast/multicast stations via a second tuner in the electronic device;

(c) evaluating the first and second sets of meta-data retrieved by the first and second tuners to identify at least one of the broadcast/multicast stations for the end-user using a decision engine in the electronic device, wherein the evaluation is performed against a preference profile of the end-user based on a previously selected persona that provides the preference profile;

(d) tuning to one of the available broadcast/multicast stations based on the evaluation via the first tuner; and (e) periodically repeating steps (a) through (d).

2. The method of claim 1, wherein steps (a) through (d) are repeated at a frequency determined by a value set in the operative preference profile.

3. The method of claim 1, wherein the electronic device comprises a radio receiver, a television, a set-top box, or a computer application.

4. The method of claim 1, wherein the evaluation in step (c) is performed using a prioritized execution list of the preference profile for the persona selected by the end-user, an associated list of rules and constraints for the persona of the end-user, and the first and second sets of meta-data.

5. The method of claim 4, wherein the preference profile and the associated list of rules and constraints applicable to the preference profile are stored in a persona database.

6. The method of claim 5, wherein the sets of data include time, station identification and program information for each of the available broadcast/multicast stations.

7. In an electronic device that is adapted to receive broadcast/multicast service, a method of imposing preferences on the broadcast/multicast service for an end-user that comprises:

loading a preference profile selected by the end-user and a list of rules and constraints applicable to the preference profile into a decision engine of the electronic device, wherein the preference profile includes at least a prioritized execution list for choosing a broadcast/multicast station;

tuning to a currently selected broadcast/multicast station with a primary tuner of the electronic device and receiving a first set of data transmitted from the first broadcast/multicast station, wherein the first set of data includes time, station identification, and program information;

activating a second tuner of the electronic device to retrieve a second set of data transmitted from a plurality of other broadcast/multicast stations that are available, wherein the second set of data includes time, station identification and program information;

loading the first and second sets of data into the decision engine; and using the prioritized execution list of the preference profile, the list of rules and constraints, and the first and second sets of data to select a broadcast/multicast station for the end-user.

8. The method of claim 7, wherein the selection of the broadcast/multicast station is automatic and the selection is periodically evaluated against all available sets of data to effect a switch-over to another station.

9. The method of claim 7, wherein the program information can include from among program type, program identification and additional information, as applicable and available, on the genre, artist, and title of song.

10. The method of claim 7, wherein the preference profile and the list of rules and constraints applicable to the preference profile are stored in a persona database in the electronic device.

11. The method of claim 10, wherein the persona database generally includes a plurality of data sub-blocks for each preference profile, wherein a first sub-block contains persona data, a second sub-block contains likes data, a third sub-block contains dislikes data, a fourth sub-block contains constraints data, and/or a fifth sub-block contains enhancements data.

12. The method of claim 7, wherein the preference profile and the list of rules and constraints applicable to the preference profile are stored in a persona database external to the electronic device.

13. The method of claim 12, wherein the persona database generally includes a plurality of data sub-blocks for each preference profile, wherein a first sub-block contains persona data, a second sub-block contains likes data, a third sub-block contains dislikes data, a fourth sub-block contains constraints data, and/or a fifth sub-block contains enhancements data.

14. The method of claim 7, wherein the list of rules and constraints includes one or more of the following options: forced de-tune and rules-based selection of another channel, selective volume manipulation of the electronic device, selective display on the electronic device, rule-based selective channel skipping, fallback to locally stored media, and/or powering off the electronic device.

15. The method of claim 7, wherein, if none of the broadcast/multicast stations meet the rules and constraints based on the preference profile of the first end-user, the decision engine chooses to play locally stored media and/or lower the volume of the electronic device.

16. An apparatus for imposing preferences on broadcast/multicast service for an end-user, the apparatus comprising:

a first tuner that receives a first set of data transmitted from a currently selected broadcast/multicast station, wherein the first set of data includes time, station identification, and program information;

a second tuner that receives a second set of data from a plurality of broadcast/multicast stations, wherein the second set of data includes individually, for each broadcast/multicast station that is available, time, station identification, and program information;

a decoder that decodes the first and second sets of data received by the first and second tuners and sends this decoded data to a decision engine for further processing; and a persona database that stores a plurality of user preference profiles, wherein the decision engine is periodically operative to evaluate the currently selected station based on a preference profile selected by the end-user.

17. The apparatus of claim 16, wherein the evaluation of the decision engine is based on whether the currently selected station is the best choice for the end-user based on the preference profile selected by the end-user and if not, then the currently selected station is de-tuned and the device tunes into the best choice for the end-user.

18. The apparatus of claim 16, wherein the program information in each set of data includes genre, artist, and title of song.

19. The apparatus of claim 16, wherein the persona database generally includes a plurality of data sub-blocks for each preference profile, wherein a first sub-block contains persona data, a second sub-block contains likes data, a third sub-block contains dislikes data, a fourth sub-block contains constraints data, and/or a fifth sub-block contains enhancements data.

20. The apparatus of claim 16, wherein the persona database is located external to the electronic device.

21. The apparatus of claim 16, wherein the persona database is located in the electronic device.

22. The apparatus of claim 16, wherein the list of rules and constraints includes one or more of the following options: forced de-tune and rules-based selection of another channel, selective volume manipulation of the electronic device, selective display on the electronic device, rule-based selective channel skipping, fallback to locally stored media, and/or powering off the electronic device.

* * * * *